United States Patent [19]
Beisswenger et al.

[11] Patent Number: 5,993,765
[45] Date of Patent: Nov. 30, 1999

[54] PROCESS FOR THE DRY DESULFURIZATION OF A COMBUSTION GAS

[75] Inventors: Hans Beisswenger, Bad Soden; Bernhard Thone, Friedberg; Wolfram Klee, Usingen, all of Germany

[73] Assignee: Metallgesellschaft Aktiengesellschaft, Frankfurt am Main, Germany

[21] Appl. No.: 08/980,716

[22] Filed: Dec. 1, 1997

Related U.S. Application Data

[63] Continuation of application No. PCT/EP96/01808, May 2, 1996, abandoned.

Foreign Application Priority Data

May 16, 1995 [DE] Germany ............................ 195 17 863

[51] Int. Cl.⁶ ............................ B01D 53/50; B01D 53/96
[52] U.S. Cl. ................................ 423/244.07; 423/244.08; 423/215.5; 423/DIG. 16
[58] Field of Search ............................... 423/210, 244.07, 423/244.08, 555, DIG. 16, 215.5; 95/70; 209/127.1

[56] References Cited

U.S. PATENT DOCUMENTS

| | | | |
|---|---|---|---|
| 4,548,797 | 10/1985 | Sauer et al. | 423/240 |
| 4,604,269 | 8/1986 | Yoon | 423/242 |
| 4,670,237 | 6/1987 | Graf et al. | 423/244 |
| 4,810,478 | 3/1989 | Graf | 423/244 |
| 5,096,680 | 3/1992 | Lindbauer et al. | 423/239 |

FOREIGN PATENT DOCUMENTS

| | | |
|---|---|---|
| 41 04 180 C1 | 6/1992 | Germany . |
| WO 96/36421 | 11/1996 | WIPO . |

*Primary Examiner*—Gary P. Straub
*Assistant Examiner*—Timothy C Vanoy
*Attorney, Agent, or Firm*—Michael J. Striker

[57] ABSTRACT

The process for dry desulfuration of a combustion gas includes providing an electrostatic precipitator (12) or an inertia force separator for dedusting; dedusting the combustion gas at temperatures of 100° C. to 180° C. in the electrostatic precipitator or at temperatures of 100° C. to 700° C. in the inertia force separator to form a partially dedusted combustion gas with a solids content of 5 to 40 g/Nm³; mixing the partially dedusted combustion gas with CaO and/or Ca(OH)₂ and optionally CaCO₃ to form a gaseous mixture; providing a circulating fluidized bed device including a fluidized-bed reactor (8) and a downstream solids separator (7) with a return line (17) to the fluidized-bed reactor (8), the solids separator (7) being either another electrostatic precipitator or a bag filter; feeding the gaseous mixture and water into the fluidized-bed reactor (8); cooling the gaseous mixture in the fluidized-bed reactor (8) to a temperature of 50° C. to 90° C.; withdrawing a solids-containing gas from an upper portion of the fluidized-bed reactor (8); feeding the solids-containing gas into the solids separator (7) to form separated solids and a cleaned gas; recycling one portion of the separated solids into the fluidized-bed reactor (8) and mixing another portion of the separated solids with the combustion gas.

10 Claims, 1 Drawing Sheet

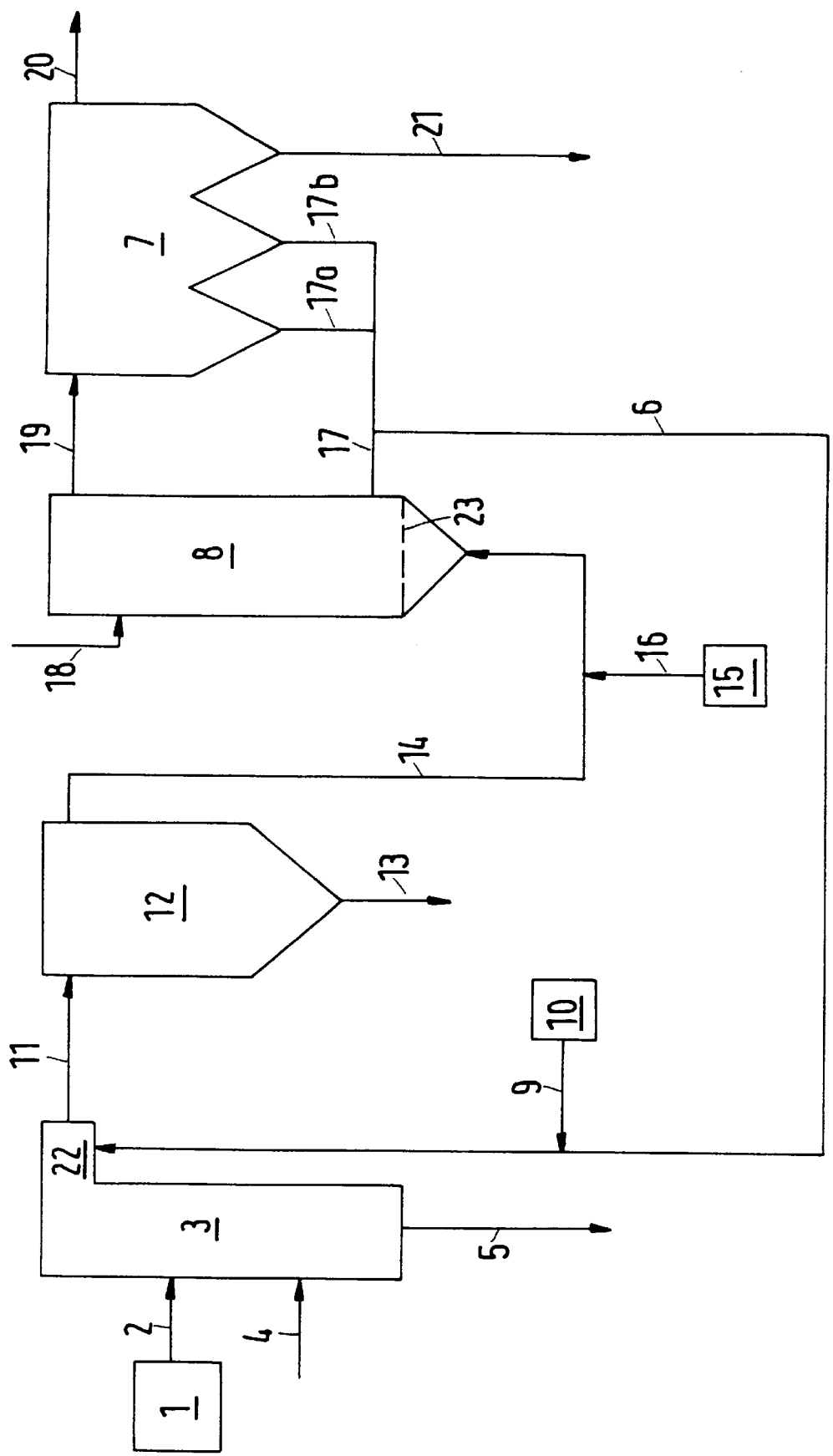

PROCESS FOR THE DRY DESULFURIZATION OF A COMBUSTION GAS

This application is a continuation application of PCT/EP 96/01808 filed May 2, 1996 now abandoned.

BACKGROUND OF THE INVENTION

This invention relates to a process for the dry desulfurization of a combustion gas, and, more particularly, to a process for dry desulfurization of combustion gas, in which the combustion gas produced in a combustion space and contaminated with fly ash as well as gaseous pollutants is dedusted, in which the dedusted combustion gas is cooled with water to a temperature of 50 to 90° C., is mixed with an absorbent consisting of CaO and/or $Ca(OH)_2$ and is supplied to a circulating fluidized bed comprising a fluidized-bed reactor, a separator and a return line, wherein the solid particles obtained in the separator are supplied in part to the fluidized-bed reactor and in part to that area of the combustion space which has a temperature of 850 to 1050° C. The process is used for the desulfurization of exhaust gases, which are produced during the combustion of solid and liquid fuels, in particular coal and oil, and during the incineration of refuse and sewage sludge.

From the German Patent Document DE-PS 41 04 180 a process for the dry desulfurization of exhaust gases from a boiler system by adding calcareous sorbents is known, wherein coarsely ground lime ($CaCO_3$) with an average grain size of 200 $\mu$m is introduced into a section of the boiler system where the exhaust gases have a temperature of 800 to 900° C., wherein upon cooling the exhaust gases are dedusted in a first electrostatic dust separator, whereupon the coarse-grained portion is ground to an average grain size of 5 to 10 $\mu$m and the medium- and fine-grained portions are discharged from the system, wherein the portion ground to 5 to 10 $\mu$m together with water and the exhaust gases is supplied to a circulating fluidized bed consisting of fluidized-bed reactor, separator and return line, and wherein the exhaust gases are finally dedusted in a second electrostatic dust separator and are discharged to the surroundings, and the $CaSO_3$- and $CaSO_4$-containing residues are returned in part to the fluidized-bed reactor and in part to the boiler system. In this known process, dedusting is effected in the first electrostatic dust separator disposed behind the boiler at a temperature of 90 to 160° C., and the temperature of the circulating fluidized bed is adjusted to 50 to 90° C. through a corresponding measured addition of water.

It is also known that in the dry desulfurization processes the conversion of the absorbents with $SO_2$ is only completed when there is a stoichiometric excess of the absorbent. A comparatively small excess of absorbent is achieved when CaO or $Ca(OH)_2$ are used as absorbents for the dry desulfurization, and when the absorbents are fine-grained and thus reactive. However, in particular in a circulating fluidized bed part of the CaO or $Ca(OH)_2$ gets lost due to the formation of calcium carbonate. This side reaction has a disadvantageous effect on the stoichiometry of the desulfurization reaction, so that for the dry desulfurization the absorbent CaO and/or $Ca(OH)_2$ must still be added in a remarkable surplus; the ratio of $SO_2$:Ca (with reference to separated $SO_2$) virtually lies above 1:1.3. Moreover, in the dry desulfurization processes failures occur, because due to a reaction of the HCl contained in the exhaust gas with the absorbent hygroscopic $CaCl_2$ is formed, which is responsible for the formation of disadvantageous cakings and agglutinations in the exhaust gas cleaning plant.

SUMMARY OF THE INVENTION

It is therefore the object of the invention to provide a process for the dry desulfurization of exhaust gases, which reliably operates also with a ratio of $SO_2$:Ca (with reference to separated $SO_2$) smaller than 1:1.2, makes the absorbent largely available for the desulfurization reaction and avoids disadvantageous cakings and agglutinations in the exhaust gas cleaning plant—in particular in the circulating fluidized bed. The resulting solid process product should possibly contain small amounts of $CaSO_3$ and $CaCO_3$ and a sufficient amount of CaO and anhydrous $CaSO_4$.

The object underlying the invention is solved by a process as stated above, in which the exhaust gas loaded with fly ash, gaseous pollutants and recirculated solid particles is dedusted in an electrostatic precipitator at 100 to 180° C. only to a solids content of 5 to 40 g/Nm$^3$, and in which the absorbent loaded with the gaseous pollutants together with fly ash is discharged from the process circulation via the outlet of the electrostatic precipitator.

Due to the fact that the electrostatic precipitator is operated with a comparatively low dedusting efficiency, a comparatively large amount of solids, which preferably contains CaO and $Ca(OH)_2$, gets into the circulating fluidized bed. Accordingly, this part of the absorbent is again supplied to the desulfurization reaction, whereas in the electrostatic precipitator only a small amount of solids is separated and discharged from the process circuit as a solid process product. This amount of solids largely consists of anhydrous $CaSO_4$ and fly ash as well as CaO. With the process in accordance with the invention it is achieved that a ratio of $SO_2$:Ca (with reference to separated $SO_2$)$\leq$1:1.2 can be used, where the clean gas only has a $SO_2$ content <50 mg/Nm$^3$. The electrostatic precipitator requires a comparatively small amount of electrical energy. The product discharged from the electrostatic precipitator can be solidified very well when adding water, and is suitable as a construction material.

In accordance with another embodiment of the invention, the electrostatic precipitator is replaced by an inertia force separator, in which the exhaust gas loaded with fly ash, gaseous pollutants and recirculated solid particles is dedusted at 100 to 700° C. only to a solids content of 5 to 40 g/Nm$^3$, and the absorbent loaded with the gaseous pollutants together with fly ash is discharged from the process circuit through the outlet of the inertia force separator. The inertia force separator can advantageously be designed as cyclone or impact separator. The inertia force separator can be provided outside the combustion space or in that part of the combustion space which has a temperature of 100 to 700° C.

Due to the fact that the inertia force separator is operated with a comparatively low dedusting efficiency, a comparatively large amount of solids, which preferably contains CaO or $Ca(OH)_2$, gets into the circulating fluidized bed. Accordingly, this part of the absorbent is again supplied to the desulfurization reaction, whereas in the inertia force separator only a small amount of solids is separated and discharged from the process as a solid process product. This proportion of solids largely consists of anhydrous $CaSO_4$ and fly ash as well as CaO. Even when using an inertia force separator it is achieved that a ratio of $SO_2$:Ca (with reference to separated $SO_2$)$\leq$1:1.2 can be used, where the clean gas only has a $SO_2$ content <50 mg/Nm$^3$. The product withdrawn from the inertia force separator can be solidified very well when adding water, and is suited as a construction material.

Both the electrostatic precipitator and the inertia force separator serve the discharge of the solid process product, which contains no $CaSO_3$ and need therefore not be subjected to an afteroxidation, since the bound sulfur is present in the process product as anhydrous $CaSO_4$.

It is particularly advantageous when the absorbent has a mean particle diameter $d_{50}$ of 2 to 20 µm. In this way it is achieved that unused absorbent is not separated in the electrostatic precipitator and in the inertia force separator, but is again supplied to the circulating fluidized bed.

In accordance with a further aspect of the invention, the absorbent is introduced into the fluidized-bed reactor below the grid, the solid particles recirculated from the separator are introduced into the fluidized-bed reactor below or above the grid, and the water is introduced into the fluidized-bed reactor above the grid. With this procedure the formation of cakings is reliably avoided, and the flowability of the solid particles is fully maintained.

Expediently, the absorbent CaO and/or $Ca(OH)_2$ is wholly or partly replaced by $CaCO_3$, which is introduced in that portion of the combustion space which has a temperature of 850 to 1050° C. By doing so, in particular the costs for the dry desulfurization of exhaust gas can be reduced, since at these temperatures CaO is formed from $CaCO_3$. By adding $CaCO_3$ the fluidized-bed reactor can be operated very close to above the dew point, since with $CaCO_3$ the ratio of $SO_2$:Ca (with reference to separated $SO_2$) can be increased to a maximum of 1:1.5, since the price of $CaCO_3$ is much lower than that of CaO and $Ca(OH)_2$, and the absorption of pollutants is promoted by a surplus of Ca.

The process in accordance with the invention can be operated optimally both in technical and in economic terms, when 50 to 80% of the absorbent are replaced by $CaCO_3$.

In accordance with a further aspect of the invention a multi-field electrostatic precipitator is used as separator of the circulating fluidized bed, and the solids separated in the last field of the electrostatic precipitator are discharged from the process circuit. With this measure it is achieved that the unburnt carbon particles, which are not separated in the first electrostatic precipitator and do therefore not reach the circulating fluidized bed, are removed from the desulfurized exhaust gas.

In accordance with an alternative aspect of the invention, a bag filter is used as separator of the circulating fluidized bed, wherein the filter cake has a content of 2 to 5 wt-% CaO and/or $Ca(OH)_2$. With this alternative procedure it is achieved that the filter cake exhibits a good cleansing behaviour, since due to the inventive content of CaO and/or $Ca(OH)_2$ in the filter cake the dust particles of the filter cake agglomerate advantageously, so that an extended period lies between the individual cleansing cycles of the bag filter.

With the process in accordance with the invention a high desulfurization efficiency can reliably be maintained, when the fluidized-bed reactor operates at 5 to 20° C. above the dew point of the combustion gas, and when in the fluidized-bed reactor a gas speed of 3 to 10 m/sec, a mean solids dwell time of 20 to 180 min as well as a mean solids loading of 1 to 10 kg/m are set. Under these process conditions, an $SO_2$ content of the clean gas <50 mg/Nm can reliably be maintained even with high $SO_2$ content in the exhaust gas. In addition, cakings and agglutinations are reliably avoided.

In accordance with the invention it is finally provided that 90 to 95% of the solid particles obtained in the separator are returned to the fluidized-bed reactor, whereas the remaining solid particles are supplied to the combustion space. With this measure it is achieved that from the $CaSO_3$, which results from the reaction of the absorbent with $SO_2$, $CaSO_4$ is formed through oxidation in the combustion space. In addition, CaO is again produced from $CaCO_3$, which can be utilized for the desulfurization reaction.

BRIEF DESCRIPTION OF THE DRAWING

The subject-matter of the invention will subsequently be explained in detail with reference to the drawing and an embodiment. The drawing shows the flow diagram of the process in accordance with the invention.

DESCRIPTION OF THE PREFERRED EMBODIMENTS

From the storage bin (1) finely divided coal is introduced via line (2) into the combustion space (3) and burnt with air, which is introduced into the combustion space via line (4). The combustion space (3) is designed as boiler, where in the drawing the heat exchangers required for the recovery of heat are not represented. The slag produced during the combustion of coal is discharged from the combustion space (3) via line (5). The combustion temperature is about 1200 to 1300° C., so that the slag is at least partly obtained in molten form. Since heat exchanger surfaces are also provided in the upper part of the combustion space (3) designed as boiler, the temperature prevailing there is lower than the combustion temperature. When entering the upper boiler space (22), the exhaust gas has a temperature of 850 to 1050° C.

The exhaust gas produced during the combustion of coal has the main constituents $CO_2$, $H_2O$, $N_2$ and $O_2$. Since the combustion of coal is effected with a surplus of air, the exhaust gas only contains trace amounts of CO. The exhaust gas is in particular contaminated with the gaseous compounds $SO_2$, HCl and $NO_x$. During the combustion, $SO_2$ and HCl are produced from the sulfur- and chlorine-containing compounds contained in the coal. The oxides of nitrogen referred to as $NO_x$ are produced during the combustion from the nitrogen compounds contained in the coal, and in part through oxidation of the nitrogen contained in the air. The combustion gas contains per $Nm^3$ about 700 mg $SO_2$, 80 mg HCl and 150 mg $NO_x$, the latter calculated as $NO_2$. The exhaust gas also contains about 20 mg $SO_3$. During the combustion, part of the slag is suspended in the combustion gas in the form of dust-like fly ash, so that the exhaust gas in the upper boiler space (22) has a content of dust-like fly ash of about 10 $g/Nm^3$. The fly ash also contains finely divided, unburnt carbon.

Via line (6) 5 to 10% of the solids are introduced into the upper boiler space (22), which are obtained in the first fields of the separator (7) designed as electrostatic precipitator, which is disposed subsequent to the fluidized-bed reactor (8). The solids contained in line (6) consist of fly ash as well as $CaSO_3$, which is oxidized almost quantitatively to form $CaSO_4$ in the upper boiler space (22), of $CaCO_3$, which in the upper boiler space (22) is decomposed into $CO_2$ and CaO, of minor amounts of $CaCl_2$, which is partly decomposed in the upper boiler space (22), and of unused CaO and $Ca(OH)_2$, where the $Ca(OH)_2$ is converted to CaO in the upper boiler space (22). In addition, $CaCO_3$ with a particle size of about 10 µm is introduced into line (6) via line (9) from the reservoir (10). This $CaCO_3$ will also be decomposed in the upper boiler space (22) by forming CaO. Due to the solids carried in line (6), the solids content of the combustion gas flowing in the upper boiler space (22) will be increased to a total of about 40 g/Nm. At the heat exchanger surfaces, which are disposed in the upper boiler space (22) and are not represented in the drawing, heat will be withdrawn from the combustion gas contaminated with gaseous pollutants and loaded with fly ash and recirculated solid particles, where a cooling to 100 to 180° C. is effected. With this temperature, the cooled combustion gas is supplied via line (11) to the electrostatic precipitator (12).

In the electrostatic precipitator (12) only a part of the dust-like fly ash and the solid particles will be separated, so that from the electrostatic precipitator (12) an exhaust gas stream will be discharged via line (14), which still has a solids content of about 36 g/Nm$^3$, which corresponds to a dedusting efficiency of 10%. In the solids discharged from the electrostatic precipitator (12) together with the gas stream, the CaO is enriched, whereas the solid particles separated in the electrostatic precipitator (12) largely consist of anhydrous CaSO$_4$ and dust-like fly ash. This process product is withdrawn via line (13) and can be used as building additive due to its high content of CaSO$_4$. Thus, the purpose of the electrostatic precipitator (12) is to separate the absorbent loaded with the gaseous pollutants and part of the dust-like fly ash from the circuit, whereas unused absorbent and the absorbent formed in the upper boiler space (22) are supplied to the circuit. This is achieved in that the electrostatic precipitator (12) is operated with a comparatively low, untypical dedusting efficiency.

When the electrostatic precipitator (12) is replaced by an inertia force separator, the same will effect the discharge of the process product. The inertia force separator is advantageously designed as cyclone or impact separator and can either be provided in the upper boiler part (22) or subsequent to the upper boiler part (22), where it is merely important that the inertia force separator operates at a temperature in the range from 100 to 700° C. The inertia force separator will also be operated with a low separation efficiency.

The solids-containing exhaust gas stream carried in line (14) is introduced into the fluidized-bed reactor (8) below the grid (23). From the reservoir (15) via line (16) Ca(OH)$_2$ with a mean particle size of 3 to 4 μm will be added to this exhaust gas stream in an amount of 1.3 g/Nm$^3$. Above the grid (23) 90 to 95% of the solid particles are introduced into the fluidized-bed reactor (8) via line (17) and are separated in the first fields of the electrostatic precipitator (7). Via line (18), which terminates in a nozzle, water is introduced into the fluidized-bed reactor (8), so that a temperature of about 65 to 70° C. is adjusted in the fluidized-bed reactor (8). This temperature lies about 15 to 20° C. above the dew point of the combustion gas. In the fluidized-bed reactor (8) the gas speed is about 3 to 5 m/sec, and the average dwell time of the solid particles is about 60 min. In the fluidized-bed reactor (8) the average solids loading is about 6 kg/m$^3$. The gaseous pollutants SO$_2$ and HCl are largely bound by the finely divided, reactive absorbent in the fluidized-bed reactor (8). Due to the inventive supply of solid particles and water to the fluidized-bed reactor (8) cakings are avoided, and the solids do not agglomerate to such an extent that malfunctions will occur.

The exhaust gas stream loaded with solids leaves the fluidized-bed reactor (8) via line (19) and reaches the separator (7) designed as multi-field electrostatic precipitator. The electrostatic precipitator is operated with a high dedusting efficiency, so that the clean gas flowing out of the electrostatic precipitator (7) via the clean gas line (20) only has a dust content <30 mg/Nm$^3$. The clean gas has an SO$_2$ content <50 mg/Nm$^3$ and a HCl content <5 mg/Nm$^3$. After the separation of NO$_x$ it can therefore be discharged to the atmosphere without further cleaning measures. The solids separated in the first fields of the electrostatic precipitator (7) are supplied to the return line (17) via lines (17a) and (17b). 92 to 95% of the solids carried in the return line (17) are again supplied to the fluidized-bed reactor (8), whereas the remaining solids are introduced into the upper boiler space (22) via line (6). The solid particles separated in the last field of the electrostatic precipitator (7) are discharged via line (21). When these solids have a high carbon content, they can be supplied to the combustion space (3); otherwise, they will be deposited on a disposal site or mixed with the process products, which are removed from the electrostatic precipitator (12) via line (13).

We claim:

1. A process for dry desulfurization of a combustion gas produced in a combustion space (3) at temperatures of from 850 to 1050° C., wherein said combustion gas contains fly ash, water vapor, recirculated solid particles and oxides of sulfur said process comprising the steps of:

a) providing a means (12) for dedusting consisting of an electrostatic precipitator or an inertia force separator;

b) feeding said combustion gas into said means (12) for dedusting;

c) dedusting said combustion gas in said means (12) for dedusting to form a partially dedusted combustion gas with a residual solids content of from 5 to 40 g per m$^3$, wherein said dedusting is performed at temperatures of from 100° C. to 180° C. when said means (12) for dedusting is said electrostatic precipitator or at temperatures of 100° C. to 700° C. when said means for dedusting is said inertia force separator;

d) withdrawing the partially dedusted combustion gas from said means for dedusting;

e) mixing said partially dedusted combustion gas with at least one absorbent selected from the group consisting of CaO, CaCO$_3$ and Ca(OH)$_2$ to form a gaseous mixture;

f) feeding the gaseous mixture and water into a circulating fluidized-bed reactor (8);

g) cooling the gaseous mixture in the fluidized-bed reactor to a temperature of from 50° C. to 90° C.;

h) withdrawing a solids-containing gas from an upper portion of the fluidized-bed reactor (8);

i) feeding the solids-containing gas into a solids separator (7) to form separated solids and a cleaned gas;

j) recycling one portion of said separated solids from said solids separator (7) into said fluidized-bed reactor (8);

k) recycling another portion of said separated solids from said solids separator (7) to said combustion space (3); and l) mixing said another portion of said separated solids recycled in step k with said combustion gas.

2. The process as defined in claim 1, wherein said means (12) for dedusting is said inertia force separator, and further comprising discharging a part of said at least one absorbent loaded with gaseous pollutants together with said fly ash from an outlet of said inertia force separator.

3. The process as defined in claim 1, wherein said at least one absorbent has a mean particle diameter d$_{50}$ of from 2 to 20 μm.

4. The process as defined in claim 1, wherein the circulating fluidized-bed reactor (8) has a grid (23), said gaseous mixture set forth in step (e) is fed into said fluidized-bed reactor (8) below said grid, said separated solids recirculated from said separator (7) are fed into said fluidized-bed reactor (8) above said grid (23) and said water is fed into the fluidized-bed reactor (8) above said grid (23).

5. The process as defined in claim 1, wherein said at least one absorbent is selected from the group consisting of CaO and $Ca(OH)_2$.

6. The process as defined in claim 1, wherein said at least one absorbent includes from 50 to 80% by weight of said $CaCO_3$.

7. The process as defined in claim 1, wherein said solids separator (7) is a multi-field electrostatic precipitator having a last field and said separated solids found in said last field are discharged from the process.

8. The process as defined in claim 1, wherein said solids separator (7) is a bag filter, a filter cake is formed in said bag filter and said filter cake comprises from 2 to 5% by weight of said CaO and/or said $Ca(OH)_2$.

9. The process as defined in claim 1, wherein the fluidized-bed reactor (8) operates at 5 to 20° C. above a dew point of said combustion gas and said gaseous mixture flows flow through said fluidized-bed reactor (8) at a gas flow speed of from 3 to 10 m/sec, with a mean solids dwell time of from 20 to 180 min, and with a means solids loading of 1 to 10 kg/m.

10. The process as defined in claim 1, wherein said portion of said separated solids recycled to said fluidized-bed reactor (8) from said solids separator (7) consists of 90 to 95% by weight of said separated solids.

\* \* \* \* \*